United States Patent [19]

Nassr et al.

[11] Patent Number: 5,760,566
[45] Date of Patent: Jun. 2, 1998

[54] CONTROL DEVICE FOR STOPPING THE OPERATION OF A SINGLE-PHASE ASYNCHRONOUS MOTOR WITH A CAPACITOR

[75] Inventors: Djafar Nassr, Illzach; Philippe Raude, Lorient; Louis Plumer, Belfort, all of France

[73] Assignee: Plumer, Société Anonyme, Saint-Louis, France

[21] Appl. No.: 789,708

[22] Filed: Jan. 27, 1997

Related U.S. Application Data

[63] Continuation of Ser. No. 580,149, Dec. 28, 1995, abandoned.

[30] Foreign Application Priority Data

Dec. 29, 1994 [EP] European Pat. Off. ............ 94440081
Sep. 29, 1995 [EP] European Pat. Off. ............ 95440062

[51] Int. Cl.⁶ ....................................................... H02P 1/42
[52] U.S. Cl. ........................... 318/774; 318/364; 318/430; 318/434; 318/138; 318/439; 318/254
[58] Field of Search ................................. 318/774, 364, 318/430, 434, 138, 439, 254, 798, 815; 361/23

[56] References Cited

U.S. PATENT DOCUMENTS

| | | | |
|---|---|---|---|
| 3,584,282 | 6/1971 | Reeves et al. | 318/434 X |
| 3,644,810 | 2/1972 | Lewus | 318/254 X |
| 4,210,948 | 7/1980 | Waltz | 361/76 |
| 4,796,142 | 1/1989 | Libert | 361/23 |
| 4,967,131 | 10/1990 | Kim | 318/776 X |
| 4,999,556 | 3/1991 | Masters | 318/139 X |
| 5,151,638 | 9/1992 | Beckerman | 318/434 |
| 5,153,489 | 10/1992 | Unsworth et al. | 318/798 X |

*Primary Examiner*—Karen Masih
*Attorney, Agent, or Firm*—Harrison & Egbert

[57] ABSTRACT

The invention relates to a control device for stopping the operation of a single-phase asynchronous motor with a capacitor in the event an overload of this motor with respect to a threshold value is detected. This device is characterized in that it includes, on the one hand, device for measuring the phase shift between any one parameter, voltage or current (U1, U2, I2, I3) of the main phase (φ1) or the secondary phase (φ2) and another one of these parameters and, on the other hand, device for controlling the stoppage capable of interrupting the current supply to the motor in the event there is measured a time delay lower than a memorized threshold value.

15 Claims, 2 Drawing Sheets

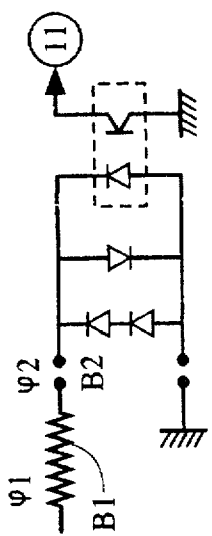
FIG. 7
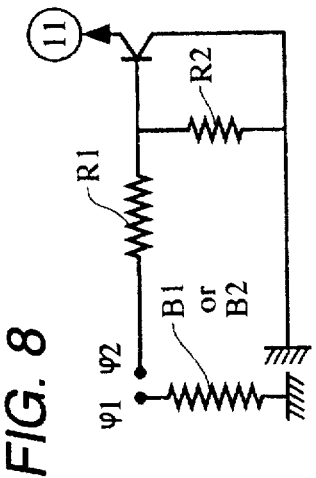
FIG. 8
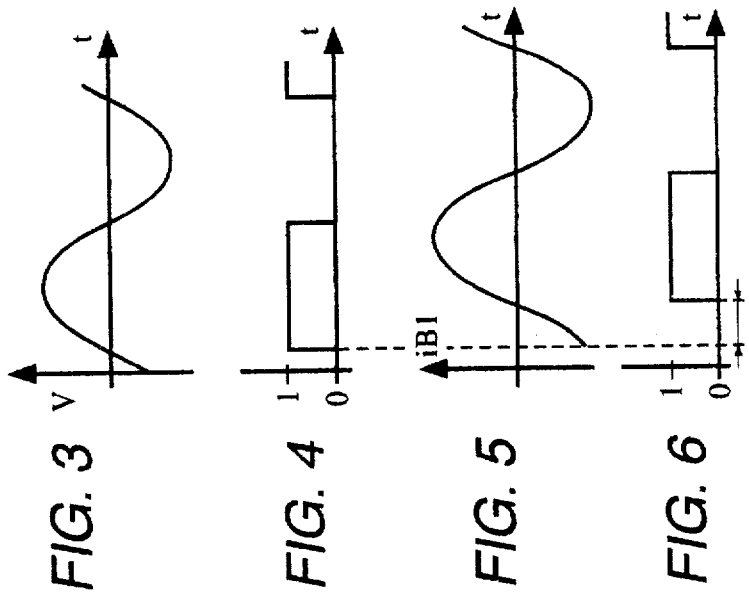
FIG. 3
FIG. 4
FIG. 5
FIG. 6
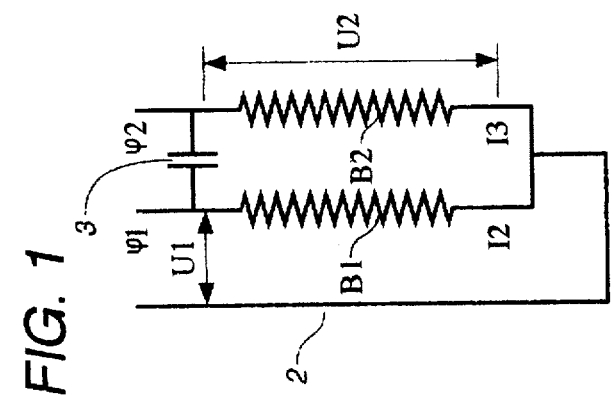
FIG. 1

CONTROL DEVICE FOR STOPPING THE OPERATION OF A SINGLE-PHASE ASYNCHRONOUS MOTOR WITH A CAPACITOR

This is a continuation of application Ser. No. 08/580,149 filed on Dec. 28, 1995 now abandoned.

BACKGROUND OF THE INVENTION (1) Field of the Invention

The invention relates to a control device for stopping the operation of a single-phase asynchronous motor with a capacitor in the event of an overload of this motor with respect to a threshold value.

(2) Description of the Prior Art

As a matter of fact, nowadays there already exist devices capable of detecting a single-phase asynchronous motor is operating with an overload and, accordingly, of controlling the stoppage of this motor. More particularly, this device includes, on the one hand, a circuit capable of supplying a direct voltage similar to the voltage at the terminals of the phase-shift capacitor of the motor and, on the other hand, a circuit supplying a constant reference voltage. This assembly is completed with a comparator circuit which compares both voltages proceeding from the preceding circuits, in order to finally deliver a stop signal when the homothetic direct voltage becomes equal to or lower than the reference voltage.

There is furthermore provided for the circuit capable of supplying the reference voltage to be subjected to the mains, so as to supply a voltage which is at any time proportional to the mains voltage, irrespective of the changes in this latter.

As a matter of fact, such a device has a number of drawbacks associated to its lack of reliability, its long reaction time and the adjustments it requires with respect to the specific characteristics of each motor.

In particular, the assembly is depending on the temperature of the motor in that this latter has an influence on the voltage at the terminals of the phase-shift capacitor. In addition, since this device is based on the principle of a comparison between direct voltages, any result can be derived only after a certain time corresponding to several alternations of the voltage at the terminals of said phase-shift capacitor has elapsed. Now, this delay at the level of the reaction time of the device can give rise to serious incidents. In particular, within the framework of the application of such a single-phase asynchronous motor to the control of the winding up and the unwinding of an apron of a roller blind.

Thus, although this device for controlling the stoppage can also intervene for stopping the motor at the end of the winding up and the unwinding of the apron, it should be appreciated that such is possible only if one is ready to accept some restraints. Namely, when winding up the apron of the roller blind and arriving at the upper end of the path, it is most likely that the delay in the control to stop the motor results into the tensioning of the apron, whereby the hinged connections between two consecutive slats of the apron get under a heavy strain. Since a same motor is frequently used for roller blinds of different sizes, this putting under strain resulting from the delay in stopping an eventually overpowered motor can cause the apron to break In the opposite case, when unwinding the apron of the roller blind, this delay in controlling the stoppage of the motor at the lower end of the path results into the putting under strain of the device for impeding the winding-up of the apron of the roller blind this latter is generally provided with. Thus, here too, this putting under strain of such a device for impeding the winding-up comprised of specific hinging means connecting the winding-up shaft to the first slat of the apron can be larger than the mechanical strength of the assembly.

The solution could eventually consist in adjusting the threshold defined by the constant reference voltage acordingly, so as to make the device more sensitive. However, because of a change, even though rather slight, in voltage at the terminals of the phase-shift capacitor with respect to the torque of the motor, the device for controlling the stoppage may not be made too sensitive, for otherwise the slightest resistance due to the frictions experienced by the apron during its winding-up or its unwinding would cause the motor to unexpectedly stop.

Finally, this known device for controlling the stoppage inevitably depends on the characteristics of the motor and, in particular, on the capacitance of the phase-shift capacitor, but also on the mains voltage, so that adjustments systematically have to be carried out. This is of course a constraint when designing the device, but above all there may therefore exist a disadjustment in the course of time. Therefore, such a device for controlling the stoppage in addition proves to be unreliable.

From U.S. Pat. No. 5,151,638 is also known another device capable of detecting a motor is operating in conditions of overload. To this end, this device monitors the phase angle between the voltage and the total current at the terminals of the motor. As a matter of fact, there is stated, within the framework of this document, that the phase angle tends towards zero when the motor load increases. Thus, according to this known device, there has been provided for detecting the zero passage of this voltage and the current, adequate means being then capable of providing a signal representative of the time delay between these latter. In particular, a ferromagnetic core is used to detect the zero passage of the current.

As a matter of fact, it should be appreciated that the phase-shift measurement is performed on the voltage of the mains supplying the current to the motor and on the total current flowing through this latter. Now, if there is indeed a relationship between the phase shift of this voltage and this total current, on the one hand, and the motor load, on the other hand, this is not systematically a proportional relationship. In addition, it strictly depends on the characteristics of the motor. This means that these devices must be adjusted according to the motor being controlled, and this through test and other operations. This only increases their cost price. In addition, as soon as there is a need for adjustment, there exists a possibility of disadjustment, so that the device proves unreliable.

SUMMARY OF THE INVENTION

This invention is aimed at coping with all the above-mentioned drawbacks, this through a very highly accurate device for stopping the operation of a single-phase asynchronous motor capable of almost instantaneously detecting an overload of the motor with a view to interrupting the current supply to same. This accuracy also results from the fact that the overload-detection threshold is almost independent from the parameters of the motor, such as the capacitance of the phase-shift capacitor or even the operating temperature of this motor.

To this end, the invention relates to a control device for stopping the operation of a single-phase asynchronous motor with a capacitor in the event an overload of this motor with respect to a threshold value is detected, characterized in that it includes, on the one hand, means for measuring the phase shift, thus the time delay, between any one parameter, voltage or current, corresponding to the main or secondary phase and another one of these parameters and, on the other hand, means for controlling the stoppage capable of interrupting the current supply to the motor in the event there is measured a time delay lower than a threshold value, preferably of the type which can be be set as a function of parameters in the memory.

Finally, the object of the invention consists in measuring the time delay, not between the voltage at the terminals of the motor and the total current flowing through this latter, but between parameters, voltage or current, corresponding to the main phase and/or the auxiliary phase of this motor. Thus, one appreciates that internal parameters of the motor and not merely those capable of being measured on the current-supply wires of same are taken into consideration. This has the advantage of leading to a proportional relationship between the phase-shift measurement performed and the load applied on the motor. This results into the device becoming almost independent from the parameters of this latter, in particular from the capacitance of the phase-shift capacitor or also from the operating temperature of said motor. In addition, it is insensitive to the changes in mains voltage within a normal range.

In addition, the control device according to the invention has an almost instantaneous reaction time, since it is capable of detecting an overload of the motor pursuant to measurements performed on one alternation.

According to another feature of the invention, the threshold value can be set as a function of parameters and the device includes means for determining the evolution of the phase shift between the parameters being compared, with a view to detecting a sudden change in this evolution by calculating its derivative and to controlling the stopping of the operation of the motor.

In some way, there is not merely detected whether the phase shift is lower or higher than a fixed value corresponding to the situation in which the motor delivers a maximum allowed torque, but there is looked for an abnormal evolution of this torque transmitted by the motor due to a suddenly larger (or smaller) resistance torque experienced by this latter. In such a case, the stoppage of the operation of said motor will in particular be controlled even before its maximum allowed torque occurs.

When considering the very particular case of the roller blinds, one appreciates that it is usual, for reasons of standardization of the parts, but also because of the manufacturing costs of a small-sized motor, to use a same motor of a given power for a range of roller blinds. In this case, there exists the possibility of adjusting the phase-shift threshold value causing the stoppage of the motor as a function of the power to be provided in particular by this latter in order to achieve the winding up of the apron of the roller blind. This proves particularly constraining, the more it is known that the roller blinds are often manufactured to measure and according to the orders being received. In such circumstances, it is necessary to proceed to the adjustment of the detection threshold individually for each motor before its fitting onto a given roller blind.

However, even in such circumstances, the control device is capable of acting on the operation of the motor only when this latter delivers a torque from which results a phase shift smaller or larger, as the case may be, than said threshold value. Thus, since the control of the stoppage at the end of the winding-up of the apron is concerned, one first observes that during this final phase of winding-up the motor meets nearly no resistance. Then, when the stops located on the end slat of the apron come in abutment, the motor produces on said apron a minimum torque, at the maximum allowed torque. At that time, the exceeding of the phase shift measured with respect to the threshold value causing the motor to stop is detected. It is obvious, under such circumstances, that the apron gets under a heavy strain under the action of said motor, in particular as far as the end slat is concerned, the stops of which accordingly rest on the abutment parts.

This invention in particular allows to avoid this, since the device is capable not only of detecting the exceeding of a threshold value by the phase shift, but a sudden change of this phase shift which is also used for controlling the stoppage of the operation of the motor, and this even before it has had the time to produce the maximum allowed torque. Such a feature therefore allows to avoid any risk of deterioration of the roller blind in the event of any clamping, irrespective of the power of the motor.

Other scopes and advantages of this invention will clearly appear during the description which follows and which relates to an embodiment shown in the attached drawings.

BRIEF DESCRIPTION OF THE DRAWINGS

FIG. 1 is a synoptical diagram of a single-phase asynchronous motor with a capacitor, FIG. 3 is a graphical illustration of the signal corresponding to the mains voltage, FIG. 4 is the conversion of the voltage signal into a substantially square signal capable of being interpreted as a logical command, FIG. 5 is a graphical illustration of the signal corresponding to the current flowing through the main coil, FIG. 6 is the conversion of the current signal into a substantially square signal capable of being interpreted as a logical command, FIG. 7 is a synoptical diagram of an example of an electronic diagram for the conversion into a square signal of the current flowing through either the main phase or the secondary phase, FIG. 8 is an illustrtion similar to FIG. 6, corresponding to a simplified diagram for the conversion into a square signal of the voltage at the terminals of either the main phase or the auxiliary phase.

DESCRIPTION OF THE PREFERRED EMBODIMENTS

Figure 2:
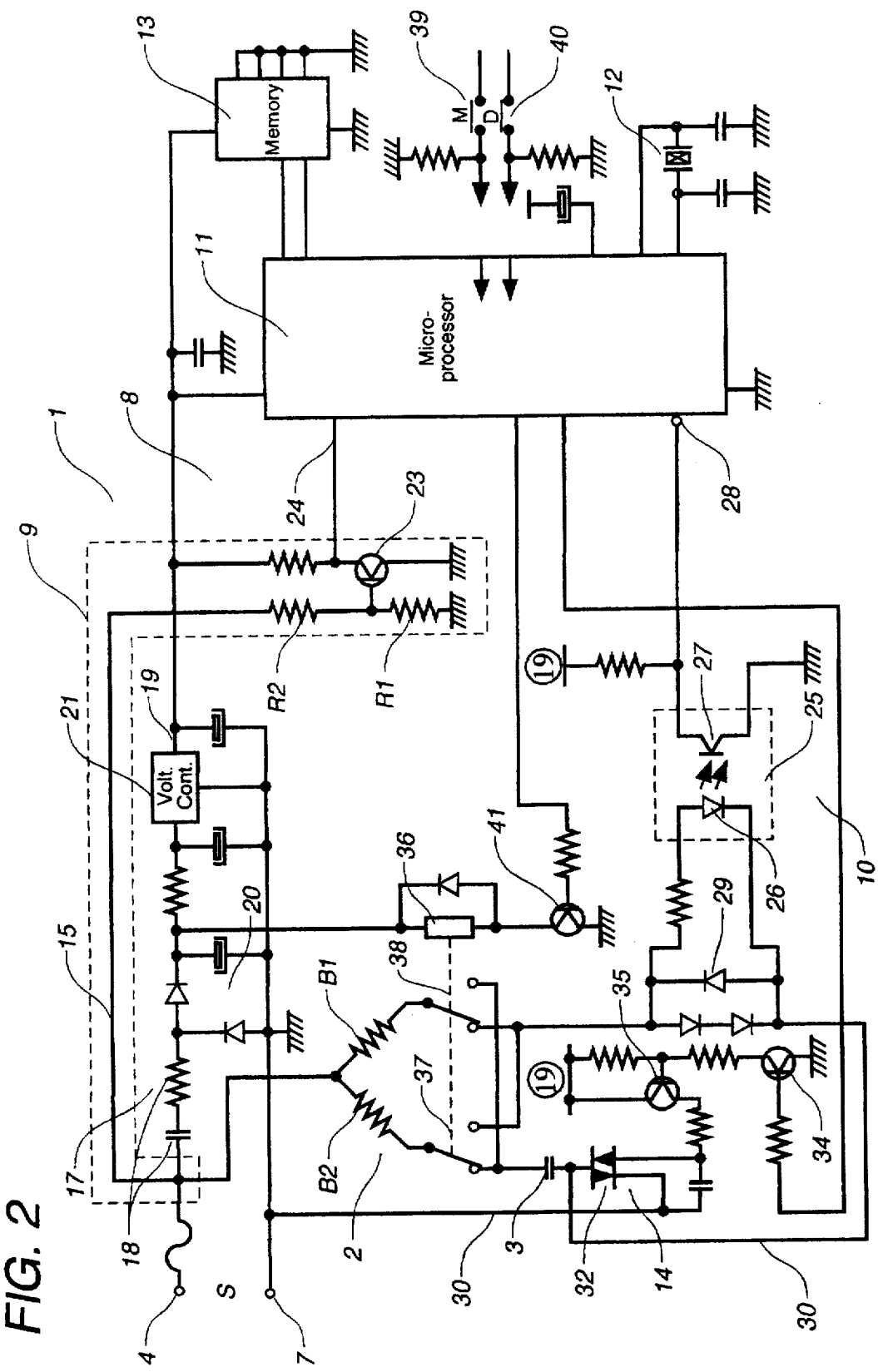
FIG. 2 is a synoptical diagram of the electronic unit including the device according to the invention.

This invention relates to a control device 1 for stopping the operation of an asynchronous motor 2 with a capacitor 3, as shown in FIG. 1. An embodiment of such a device 1 is shown in FIG. 2.

Thus, this motor 2 is characterized by a main coil B1 and an auxiliary coil B2, on the one hand, connected to the common terminal 4 of the mains S and, on the other hand, connected to each other through the phase-shift capacitor 3 capable of creating the rotating field for controlling the rotation of the motor. In this respect, it should be appreciated that this main coil B1 is also connected to the terminal 7 of the mains S corresponding to the main phase $\phi1$.

As regards the device 1 for controlling the stoppage, it is aimed at detecting an eventual overload of the motor 2 with respect to a threshold value, preferably of the type which can be set as a function of parameters. The device 10 serves to almost instantaneously control the stopping of the operation of this motor 2.

For this purpose and according to the invention, the device 1 for controlling the stoppage includes means 8 for measuring the time delay and, thus, the phase shift between any one parameter, voltage U1, U2 or current I2, I3, of the main phase $\phi1$ corresponding to the main coil B1 or of the secondary phase $\phi2$ corresponding to the auxiliary coil B2 and another one of these parameters U1, U2, I2, I3.

In order to make easier the understanding of this invention, the description which follows more particularly relates to the embodiment shown in FIG. 2 which corresponds to the case in which the device 1 includes means 8 for measuring the time delay between the mains voltage U1 and the current I2 flowing through the main coil B1, thus between the parameters of the main phase $\phi1$. However, later within the framework of this description will be set forth how to measure the phase shift existing between other ones of these parameters of the main phase $\phi1$ and of the secondary phase $\phi2$.

Thus, according to the embodiment shown in FIG. 1, these measuring means 8 include means 9 for detecting the voltage of the main phase 41 (the power supply voltage) as it reaches a predetermined threshold, preferably substantially zero. The measuring means 8 also includes a means 10 for detecting the current 12 flowing through the main coil B1 when it reaches a predetermined threshold, preferably substantially zero. It should be appreciated that when the detection of the passage at substantially zero of a voltage or a current is preferred to measure the phase shift, this is simply because this solution leads to easiness, since it allows to become independent from the difference in scale existing between both parameters being compared. However, the detection of the passage at any threshold whatsoever may of course be contemplated and gives rise to no problem at all when the parameters being compared are of the same nature (voltage/voltage; current/current).

The device 1 furthermore includes a microprocessor 11 connected to a clock 12 and which is capable of measuring a time delay, with a view to comparing same to a known threshold value of a memory 13 and which is, preferably, of the type which can be set as a function of parameters, this in order to control, should the case arise, the stoppage of the motor 2 through appropiate control means 14. The time delay that the microprocessor measures is to be described hereinafter.

It should be appreciated that the device furthermore includes a low-voltage direct-current supply 19 which namely intervenes in the control of the microprocessor 11. In particular, at the level of the circuits of this low-voltage direct-current supply 19 are to be found means 17 for lowering the voltage and the power, these means 17 being in particular defined by a resistor 18A and a capacitor 18B. Then, this assembly is associated to a current-rectifying circuit 20 of classical design preceding a voltage control 21. Accordingly, at the outlet of this latter is available a low-voltage direct-current supply capable of intervening within the framework of the logical commands received or transmitted by the microprocessor 11.

As regards the detection means 9, they consist of a circuit 15 capable of converting the sinusoidal signal of the mains voltage, as schematically shown in FIG. 3, into a substantially square signal where each voltage jump corresponds to the passage at approximately zero of the voltage U1. This substantially square signal is adapted to form a 0- or 1-type logical command capable of being interpreted by the microprocessor 11.

To this end, the terminal 4 of the mains S corresponding to the main phase $\phi1$ supplies with current, through a dividing bridge R1/R2, the base of a NPN transistor 23 which is conductive when the voltage U1 is positive and is, on the other hand, locked when the voltage U1 is negative or zero. Accordingly, as soon as this voltage U1 becomes positive, this NPN transistor 23 connects the pin 24 of the microprocessor 11 to the earth corresponding to a logical command at the zero state. On the other hand, in the event of a negative or zero voltage, the NPN transistor 23 is locked, so that the pin 24 of the microprocessor is connected to the low-voltage supply 19 corresponding to a 1-state logical command.

Reverting to the general design of the device 1 which provides for the possibility of measuring the phase shift between different parameters of the main phase $\phi1$ and the secondary phase $\phi2$, it will be appreciated that FIG. 8 is a simpliefied illustration of these detecting means 9 applied to any phase whatsoever to detect the zero passages of a voltage U1 or U2 in this phase. Thus, here the dividing bridge R1/R2 through which the base of a NPN transistor is supplied with current is also to be found.

As regards the means 10 for detecting the zero passage of the current I2 in the main phase $\phi1$ and thus flowing through the main coil B1, they include an optocoupler 25 comprising a LED diode 26 which, when it is conductive and, thus, when a current is flowing through same, causes the biassing of the base of a NPN phototransistor 27, in order to make this latter conductive. At that time, a pin 28 of the microprocessor 11 being connected to the earth detects a 0-state of logical command.

In the opposite case, i.e. when the LED diode 26 is locked, the NPN phototransistor 27 is, in turn, locked, so that the pin 28 is then connected to the low-voltage supply 19, giving rise to a 1-state logical command. It will be easily undertood that instead of using a NPN phototransistor 27, one may use a PNP phototransistor, reversing e.g. the mounting of the LED diode 26 in the circuit.

This optocoupler 25 is mounted in parallel, at a diode-current shunt 29, on the electric connection 30 connecting the main coil B1 to the terminal 7 of the mains S.

Thus, through this optocoupler 25 is transmitted to the microprocessor 11 a substantially square signal (see FIGS. 5 and 6) each transition of which, similar to the changing of a logical command from the 0-state to the 1-state, or vice-versa, corresponds to the passage at substantially zero of the current flowing, in this case, through the main coil B1.

Here too, these detecting means 10 are shown in their general design for measuring a current I2 or I3 flowing through the main phase $\phi1$ or the secondary phase $\phi2$ in FIG. 7 of the attached drawings. There can be seen in particular the presence of this optocoupler 25 which is supplied with current by a diode-current shunt 29.

Therefore, according to the parameters the phase shift of which one wants to determine, use will be made, depending on the case, of detecting means 9, as shown in FIG. 8, associated to the main phase $\phi1$ and/or to the secondary phase $\phi2$ or detecting means 10, as shown in FIG. 7, which can also be associated to said main phase $\phi1$ or to said secondary phase $\phi2$.

Thus, when it is desired to measure the phase shift between the voltage U1 of the main phase $\phi1$ and the current I2 of the main phase φ1, a combination of detecting means 9, 10, as shown in FIG. 2, is chosen.

Within the framework of the measurement of the phase shift between the voltage U2 in the secondary phase φ2 and the current I3 in the secondary phase φ2, this combination of detecting means 9, 10, as shown in FIG. 1, is also used, but in particular applied to said secondary phase φ2, thus to the auxiliary coil B2.

Within the framework of the measurement of the phase shift between the voltage U1 in the main coil B1 (main phase) and the voltage U2 in the auxiliary coil B2 (secondary phase), detecting means 9, as shown in FIG. 8, will be applied to each phase.

Finally, when the phase shift between the current I2 flowing through the main coil B1 and the current I3 flowing through the auxiliary coil B2 is to be measured, it is convenient to associate to each phase detecting means 10 corresponding to the diagram in FIG. 7 and making use, in particular, of an optocoupler which has the advantage of providing a galvanic insulation between the mains current-supply and the current supply of the microprocessor 11.

Finally, through these square-shaped signals delivered by said detecting means 9, 10, it is easy for the microprocessor 11, thanks to the clock 12, to measure at each alternation the delay between both parameters taken into consideration to measure the phase shift and to compare same to a time corresponding to a threshold value, preferably, which can be set as a function of parameters. It should however be appreciated that during the transitory phases corresponding to the starting of the motor 2 fluctuations occur at the level of this phase shift. Thus, in order to prevent the device from causing unexpected stoppages of the motor 2, there is provided for the means 8 for measuring the time delay not to be operative during these transitory starting periods. More exactly, the measurements performed or are interpreted by the microprocessors 11 only after a given time similar to this phase of starting of the motor 2 has elapsed, which time preferably corresponds to a determined number of alternations of the voltage U1, U2 or of the current I2, I3.

After this transitory period has elapsed, the measuring means 8 fully play their role, so that in the event of a given phase shift the device 1 controls the stopping of the operation of the motor 2.

As a matter of fact, as already stated above, the reference threshold value is of the type which can be set as a function of parameters. The purpose being to be able to stop the motor 2 not merely when it is brought to produce a torque larger than a given limit value, but also when, during an operation cycle, there is observed a sudden and abnormal increase, or even decreases, of the torque produced by the motor. When taking the example of a motor-driven roller blind and when considering the more specific case of the cycle of winding-up of the apron, from an unfolded position to a fully wound-up position, it is known that, because of a progressive reduction of the weight of said apron, the motor is brought to produce a progressively smaller torque. Accordingly, when this this torque suddenly tends to increase during this cycle, this means that there exists a clamping in the path of the apron. Now, when the device is capable of controlling the stoppage of the motor only in the event a fixed threshold value is exceeded, the motor will necessarily continue to run, until it produces the maximum allowed torque. Now, within the framework of a clamping in particular of the path of a slat of the apron, this latter might not withstand this power transmitted by the motor 2. Earlier in the description has also been set forth the problem of the arrival at the upper end of the path of the apron where the motor normally produces a minimum torque.

In order to cope with these drawbacks, the control device 1 according to the invention in addition includes means for determining the evolution in the course of time of the phase shift betweeen the parameters being compared, with a view to measuring a sudden change in this evolution and to controlling the stopping of the operation of the motor 2 when detecting such a sudden change in this phase shift.

Thus, the function of these determination means associated to the microprocessor 1 is to calculate the gross derivative Db which is obtained by substracting from the phase shift measured at a given time the previously measured phase-shift value. According to a first embodiment, when the value of this derative is higher than a threshold value (called derived threshold) in the memory 13, it is inferred that there is an abnormal evolution of the phase shift and, hence, an obligation to stop the motor 2.

However, within the framework of this process of determining the evolution of the phase shift it should be appreciated that the calculation of the gross derivative Db at a given time can be heavily influenced by a cause which is not actually due to a sudden increase of the torque produced by the motor 2. Thus, during the measurement, electronic noise and other influential parameters may interfere.

To this end, it is preconized, according to the invention, to proceed to the calculation of a sliding derivative Dg(x) which consists in adding to the calculation of the gross derivative Db determined in the above-mentioned conditions the value of the sliding derivative Dg(x−1) previously calculated, which will be multiplied by a given filtration coefficient. This is thus an iterative function and when calculating the sliding derivative Dg(x+1) corresponding to the following measurement, this sliding derivative Dgx which has just been calculated and to which will be applied the filtration coefficient will be taken into consideration. In this respect, during the first phase-shift measurement after the transitory operation period, the measurement of the sliding derivative Dg1 corresponds to the gross derivative Db1. As regards the sliding derivative Gd2 determined at the next point, this will accordingly correspond to the gross derivative Db2 determined at that moment, plus the gross derivative Db1 at the previous moment multiplied by said filtration coefficient.

Finally, the stoppage of the motor will be controlled only when the sliding derivative is higher than a threshold value, which allows to guarantee, in some way, that the evolution of the curve effectively goes in the undesired direction, in that not only the gross derivative at a given moment, but also the one which has been calculated during one or several preceding alternations are taken into consideration. Thus, the function applied for the calculation of this sliding derivative at a given point is of the type:

$$Dgx = A.Dbx + A'.Db(x-1) + A''.Db(x-2) \text{ etc...}$$

where Dgx: sliding derivative at point x

Dbx: gross derivative at that point x

A, A', A'' etc . . . : coefficient.

It should be noted that this function may be so defined that only the gross derivatives corresponding to a limited number of points are effectively taken into consideration. It should be appreciated that the phase shift can be determined on one alternation, this operation can be repeated on each alternation, as well as the sliding derivative can be determined with the same periodicity.

Thus, the control to stop the motor 2 can be obtained, on the one hand, when the phase shift between two parameters of said motor 2 exceeds a given threshold value and, on the other hand, when the sliding derivative Dg of the evolution curve of this phase shift is itself higher than a threshold value, which in particular allows to control this stoppage of the motor in the event of an abnormal disfunctioning of this latter and this even before it reaches the maximum allowed torque.

As stated above, the interruption of the operation of the motor 2 is obtained through means 14 mainly including a triac 32. This triac 32, which is preferably mounted on the electric connection 30 connecting the main coil B1 to the terminal 7 of the mains S, is supplied with current when the logical command proceeding from the microprocessor 11 is in the 0-state. This mounting is preferable, in that it leads to a lesser energy consumption. A reversed mounting could also be contemplated.

Reverting to the situation corresponding to FIG. 2 of the attached drawings, when the microprocessor 11 detects a time delay smaller than the threshold value in memory 13 or when it detects an abnormal evolution of the phase-shift time between both parameters being measured, it transmits, through its pin 33, a 1-state logical command. More specifically, it supplies current to the base of a NPN transistor 34 connecting the base of a PNP transistor 35 to the earth. This latter is than locked, whereby it does no longer supply current to the triac 32 which interrupts the electric connection 30 connecting the main coil B1 to the mains S.

As stated above, depending on the direction of rotation imparted to the motor 2, either coil B1, B2 becomes the main coil. Therefore, in order for the device 1 for controlling the stoppage to be able to intervene, irrespective of the direction of rotation imparted to the motor 2, it is necessary to divide into two sets the detecting means 10 mounted in series on each of the electric connections connecting the coil B1, B2 to the mains S through a RT relay for controlling the reversal of direction. However, according to a preferred embodiment, the device 1 for controlling the stoppage includes a RT relay 36 capable of controlling two contacts 37, 38 which connect, as the case may be, coil B1 or coil B2 to the mains S through the electric connection 30 including the detecting means 10. Simultaneously, the other coil B2, B1, respectively, is converted, through these contacts 37, 38 into the auxiliary coil.

The control of the RT relay 36 is ensured through a logical command transmitted by the microprocessor 11 which itself receives a logical command transmitted through normally open monostable pushbutons M and D 39, 40.

Thus, in the case the microprocessor 11 has received, during the preceding control, a 1-state logical command proceeding from the pushbutton M 39 and it now receives a 1-state logical command proceeding from the pushbutton D 40, it transmits a 1-state logical command to a NPN transistor 41 the base of which is then biassed. Since the NPN transistor is conductive under these circumstances, it connects the RT relay 36 to the earth, which relay is furthermore connected to the common terminal 4 of the mains, so that it is supplied with current, causing the switching over of the contacts 37, 38 and the reversal of the direction of rotation of the motor 2.

It should be reminded, at this point, that though the description in particular relates to the embodiment shown in FIG. 2 and corresponding to the case in which the phase shift is measured between the voltage U1 and the current I2 of the main phase $\phi 1$, the situation is identical when different parameters are compared as to their phase shift.

In short and as stated above in the description, taking into consideration the proportional relationship existing between, on the one hand, the time delay between one parameter, current or voltage, of the main phase $\phi 1$ or the secondary phase $\phi 2$ of the motor and another one of these parameters and, on the other hand, the load of said motor, which load is in addition independant from the characteristics of this latter and namely from its temperature or also from the capacitance of the phase-shift capacitor, it has been possible to achieve a device for controlling the stoppage leading to an almost instantaneous reaction time and to a so far never achieved accuracy.

In addition, since this device has the possibility of determining an abnormal evolution of the curve corresponding to the phase shift between the parameters being compared during a given operation cycle, it allows to avoid an eventual deterioration of the equipment.

In particular, this invention will find an advantageous application in the field of the motorization of roller blinds which give rise to a large number of problems either during the apron-winding-up or unwinding cycles or also for controlling the stoppage of the motor at the end of the path.

Finally, this invention actually allows to contemplate this stoppage of the motor at the upper and lower end of the path of the roller blind without there being any risk of a breakage of the apron e.g. due to the delay in controlling the stoppage which is usually carried out by the hitherto known devices.

In addition, the device is capable of detecting a failure of the components of the motor. Thus, the short-circuiting of the capacitor inevitably causes a phase shift which lies beyond the standard values. In particular, this phase shift tends to abnormally evolve when taking into consideration the derivative of the curve. In the same way and for the same reasons, the device is capable of detecting a short-circuit at the level of the coils B1, B2.

It should be appreciated that for the time being and in the absence of such a device according to the invention, such a short-circuit in the capacitor or the coils results into a heating-up of the motor, until the interruption of its supply with current occurs through the thermal safety this kind of asynchronous motor with a capacitor is usually provided with according to the standards applicable.

In comparison, thanks to the device according to the invention, the thermal safety is not activated in the event of a default which is detected before the motor is completely deteriorated.

Finally, thanks to this invention, it is possible, within the framework of the specific application to motor-driven roller blinds, to use, also for small-size roller blinds, a motor which is normally intended for large-size roller blinds without there being any risk whatsoever of deteriorating same due to this motor being overpowered. This not only allows a standardization at the level of the products, but also avoids the manufacturing of small-size motors which are often of a higher cost price.

What is claimed:

1. A control device for stopping a upon a detection of an overload condition single-phase asynchronous motor, the motor having a main coil and an auxiliary coil, a capacitor being connected to said main coil and said auxiliary coil, the main coil and the auxiliary coil defining a main phase and a secondary phase, the control device comprising:

phase shift measurement means electrically connected to said main coil and said auxiliary coil, and phase shift measurement means for measuring a phase shift between a first parameter and a second parameter of the main phase and the secondary phase, said first and second parameters being different parameters, said parameters being voltage and current; and interruption means electrically connected between said phase shift measurement means and the motor, and interruption means for interrupting a current to the motor upon the phase shift measurement means measuring a time delay below a known threshold value, said time delay being a time of said phase shift between said parameters, said known threshold value being stored in a memory electrically connected to said interruption means.

2. The device according to claim 1, said phase shift measurement means having a means for detecting a passage of a voltage of the main phase to a predetermined threshold of approximately zero, and a means for detecting a passage of the current flowing through said main phase to a predetermined threshold of approximately zero.

3. The device according to claim 1, said phase shift measurement means having a means for detecting a passage of a voltage of the secondary phase to a predetermined threshold of approximately zero, and a means for detecting a passage of the current flowing through said secondary phase to a predetermined threshold of approximately zero.

4. The device according to claim 1, said phase shift measurement means having a means for detecting a passage of a voltage of the main phase and a voltage of the auxiliary phase to a predetermined threshold of approximately zero.

5. The device according to claim 1, said phase shift measurement means having a means for detecting a passage of a voltage of the main phase to a predetermined threshold of approximately zero, and a means for detecting a passage of a current flowing through the secondary phase to a predetermined threshold of approximately zero.

6. The device according to claim 1, said phase shift measurement means having a means for detecting a passage of a voltage of the secondary phase to a predetermined threshold of approximately zero, and a means for detecting a passage of the current flowing through the main phase to a predetermined threshold of approximately zero.

7. The device according to claim 1, said phase shift measurement means having a means for detecting a passage of the current flowing through the main phase and the current flowing through the secondary phase to a predetermined threshold of approximately zero.

8. The device according to claim 1, further comprising a microprocessor means connected to said phase shift measurement means, said microprocessor means having a clock means for measuring the time of a phase shift, said microprocessor means for comparing said time of the phase shift to said known threshold value, said microprocessor means connected to said interruption means for transmitting a signal to said interruption means so as to stop the motor.

9. The device according to claim 1, further comprising means for detecting a passage of a voltage to a predetermined threshold of approximately zero, said means for detecting comprising a circuit means for converting a sinusoidal signal of said voltage into a substantially square signal where a voltage jump corresponds to the passage of said voltage to said predetermined threshold, said substantially square signal forming a 0- or 1-type logical command.

10. The device according to claim 1, further comprising means for detecting a passage of a current to a predetermined threshold of approximately zero, said current flowing through the main phase or the secondary phase, said means for detecting comprising an optocoupler means for transmitting a substantially square signal having a plurality of transitions therein, each transition corresponds to a passage of the current to said predetermined threshold.

11. The device according to claim 10, the optocoupler being mounted through a diode-current shunt onto an electric connection connecting the main coil or the auxiliary coil of the motor to a power supply.

12. The device according to claim 11, including further comprising an RT relay means for controlling two contacts which connect said main coil or said auxiliary coil to the power supply, said RT relay means for controlling a reversal of direction of rotation of said motor.

13. The device according to claim 12, the RT relay means being controlled through a logical command transmitted by a microprocessor.

14. The device according to claim 1, a triac mounted on an electric connection connecting said main coil or said auxiliary coil to a power supply, the device further comprising a microprocessor means electrically connected to said interruption means, said microprocessor means for transmitting a logical command so as to interrupt a current supply to the triac.

15. The device according to claim 1 further comprising:

means for determining an evolution of the phase shift between the parameters for detecting a sudden change in said evolution, said means for determining being electrically connected to said interruption means so as to pass a signal to said interruption means to cause said interruption means to stop the motor when the threshold valve is reached or exceeded by a derivation of a value of a phase shift measured at a previous time is subtracted from a value of a phase shift measured at a present time.

\* \* \* \* \*

UNITED STATES PATENT AND TRADEMARK OFFICE
CERTIFICATE OF CORRECTION

PATENT NO. : 5,760,566
DATED : Jun. 2, 1998
INVENTOR(S) : Djafar Nassr; Phillippe Raude; Louis Plumer It is certified that error appears in the above-identified patent and that said Letters Patent is hereby corrected as shown below:

On the title page, Item [73], delete "Plumer, Société Anonyme, Saint-Louis, France"

and insert therefor --Alaide, Société Anonyme, Saint-Louis, France--.

Signed and Sealed this

Fifteenth Day of June, 1999

Attest:

Q. TODD DICKINSON

*Attesting Officer*   *Acting Commissioner of Patents and Trademarks*